US010834762B2

(12) United States Patent
Sahlin

(10) Patent No.: US 10,834,762 B2
(45) Date of Patent: Nov. 10, 2020

(54) RANDOM ACCESS PREAMBLE RECEIVER

(71) Applicant: TELEFONAKTIEBOLAGET L M ERICSSON (PUBL), Stockholm (SE)

(72) Inventor: Henrik Sahlin, Mölnlycke (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 58 days.

(21) Appl. No.: 16/301,323

(22) PCT Filed: May 9, 2017

(86) PCT No.: PCT/IB2017/052709
§ 371 (c)(1),
(2) Date: Nov. 13, 2018

(87) PCT Pub. No.: WO2017/195119
PCT Pub. Date: Nov. 16, 2017

(65) Prior Publication Data
US 2019/0200398 A1 Jun. 27, 2019

Related U.S. Application Data

(60) Provisional application No. 62/336,190, filed on May 13, 2016.

(51) Int. Cl.
*H04W 74/08* (2009.01)
*H04L 27/26* (2006.01)
*H04W 56/00* (2009.01)

(52) U.S. Cl.
CPC ....... *H04W 74/0833* (2013.01); *H04L 27/265* (2013.01); *H04L 27/2613* (2013.01);
(Continued)

(58) Field of Classification Search
CPC .......... H04W 74/0833; H04W 56/0015; H04L 27/2663; H04L 27/2613; H04L 27/265;
(Continued)

(56) References Cited

U.S. PATENT DOCUMENTS 10,075,933 B2 * 9/2018 Shukair ............ H04W 74/0833
2009/0225908 A1 * 9/2009 Masuda ............. H04L 27/2647
375/343
(Continued)

FOREIGN PATENT DOCUMENTS

CN 102026231 A 4/2011
EP 1956771 A2 * 8/2008 ........ H04W 72/1226
(Continued)

OTHER PUBLICATIONS

Ericsson, "PRACH Design for Enhanced LAA", 3GPP TSG RAN WG1 Meeting #84bis, R1-163146, Apr. 11-15, 2016.
(Continued)

*Primary Examiner* — Lan-Huong Truong

(57) ABSTRACT

Systems and methods for processing a Random Access (RA) transmission are disclosed. In some embodiments, a method of operating a radio access node in a cellular communications network includes receiving an RA transmission from a wireless device. The method also includes detecting an RA preamble in the RA transmission from the wireless device and estimating a timing parameter of the wireless device using the RA transmission from the wireless device separately from detecting the RA preamble. By estimating the timing parameter separately from detecting the RA preamble, increased detection of the RA preamble is possible while also increasing the precision of the timing parameter estimate. In some embodiments, this separation also enables a complexity reduction of the receiver if a low complexity detector is used first and then the high complexity timing estimator is only used when an RA preamble is detected.

23 Claims, 17 Drawing Sheets

(52) U.S. Cl.
CPC ...... *H04L 27/2663* (2013.01); *H04L 27/2671* (2013.01); *H04L 27/2675* (2013.01); *H04L 27/2684* (2013.01); *H04W 56/0015* (2013.01)

(58) Field of Classification Search
CPC ............. H04L 27/2671; H04L 27/2684; H04L 27/2675
See application file for complete search history.

(56) References Cited

U.S. PATENT DOCUMENTS

| | | | |
|---|---|---|---|
| 2015/0016312 A1* | 1/2015 | Li | H04L 5/14 370/280 |
| 2015/0146631 A1 | 5/2015 | Kim et al. | |
| 2016/0029358 A1* | 1/2016 | Hou | H04W 74/0833 370/329 |
| 2017/0019928 A1* | 1/2017 | Viraraghavan | H04W 72/0446 |

FOREIGN PATENT DOCUMENTS

| | | |
|---|---|---|
| EP | 1956771 A2 | 8/2008 |
| WO | 2015144256 A1 | 10/2015 |
| WO | 2015188861 A1 | 12/2015 |

OTHER PUBLICATIONS

Ericsson, "On Performance of PRACH for Enhanced LAA", 3GPP TSG RAN WG1 Meeting #84bis, R1-163147, Apr. 11-15, 2016.
Huawei et al., "PRACH for eLAA", 3GPP TSG RAN WG1 Meeting #84bis, R1-162132, Apr. 11-15, 2016.
Ericsson, "On Performance of PRACH for Enhanced LAA", 3GPP TSG RAN WG1 Meeting #85, R1-165152, May 23-27, 2016.

* cited by examiner

_US 10,834,762 B2_

RANDOM ACCESS PREAMBLE RECEIVER

RELATED APPLICATIONS

This application is a national stage application of International Patent Application No. PCT/IB2017/052709, filed May 9, 2017, which claims the benefit of provisional patent application Ser. No. 62/336,190, filed May 13, 2016, the disclosures of which are hereby incorporated herein by reference in their entireties.

TECHNICAL FIELD

The disclosed subject matter relates generally to telecommunications and more particularly to receivers and related technologies.

BACKGROUND

The upcoming standalone Long Term Evolution in Unlicensed Spectrum (LTE-U) forum and future Third Generation Partnership Project (3GPP) Rel-14 work item on uplink Licensed-Assisted Access (LAA) intends to allow LTE User Equipments (UEs) to transmit on the uplink in the unlicensed 5 gigahertz (GHz) or license-shared 3.5 GHz radio spectrum. For the case of standalone LTE-U, the initial Random Access (RA) and subsequent uplink (UL) transmissions take place entirely on the unlicensed spectrum. Regulatory requirements may not permit transmissions in the unlicensed spectrum without prior channel sensing. Because the unlicensed spectrum is generally shared with other radios of similar or dissimilar wireless technologies, a so-called Listen-Before-Talk (LBT) method should be applied. LBT involves sensing the medium for a pre-defined minimum amount of time and backing off if the channel is busy. Therefore, the initial RA procedure for standalone LTE-U should involve as few transmissions as possible and also have low latency, such that the number of LBT operations can be minimized and the RA procedure can then be completed as quickly as possible. There is a need for an improved RA procedure to address these issues.

SUMMARY

Systems and methods for processing a Random Access (RA) transmission are disclosed. In some embodiments, a method of operating a radio access node in a cellular communications network includes receiving an RA transmission from a wireless device. The method also includes detecting an RA preamble in the RA transmission from the wireless device and estimating a timing parameter of the wireless device using the RA transmission from the wireless device separately from detecting the RA preamble. By estimating the timing parameter separately from detecting the RA preamble, increased detection of the RA preamble is possible while also increasing the precision of the timing parameter estimate. In some embodiments, this separation also enables a complexity reduction of the receiver if a low complexity detector is used first and then the high complexity timing estimator is only used when an RA preamble is detected.

In some embodiments, estimating the timing parameter of the wireless device includes estimating the timing parameter of the wireless device using the random access transmission from the wireless device in response to detecting the random access preamble in the random access transmission from the wireless device.

In some embodiments, detecting the RA preamble in the RA transmission from the wireless device includes detecting the RA preamble using a narrowband Inverse Fast Fourier Transform (IFFT) of the RA transmission from the wireless device.

In some embodiments, detecting the RA preamble in the RA transmission from the wireless device includes detecting the RA preamble using an oversampled IFFT of the RA transmission from the wireless device. In some embodiments, using the oversampled IFFT of the RA transmission from the wireless device includes zero padding of the signal to be processed by the IFFT.

In some embodiments, estimating the timing parameter of the wireless device using the RA transmission from the wireless device includes estimating the timing parameter using a wideband IFFT of the RA transmission from the wireless device. In some embodiments, using the wideband IFFT includes calculating an IFFT of the RA transmission from the wireless device where values that do not contain the RA preamble are zeroes such that the wideband IFFT spans a whole system bandwidth.

In some embodiments, receiving the RA transmission from the wireless device includes receiving multiple interlaced RA intervals where each interval contains the RA preamble. In some embodiments, each of the multiple RA intervals is one resource block.

In some embodiments, the method also includes extracting the interlaced RA intervals from the RA transmission from the wireless device and processing each RA interval with a corresponding matched filter.

In some embodiments, each RA interval includes a cyclic prefix and each of the corresponding matched filters is the same. In some embodiments, each RA interval does not include a cyclic prefix and at least one of the corresponding matched filters is different.

In some embodiments, the cellular communications network is a Long Term Evolution (LTE) cellular communications network. In some embodiments, the cellular communications network is a Long Term Evolution in Unlicensed Spectrum (LTE-U) cellular communications network. In some embodiments, the cellular communications network is a New Radio (NR) cellular communications network.

In some embodiments, receiving the RA transmission from the wireless device includes receiving the RA transmission from the wireless device on a Physical Random Access Channel (PRACH). In some embodiments, the radio access node is a base station. In some embodiments, the wireless device is a User Equipment (UE).

In some embodiments, radio access node includes at least one processor and memory. The memory includes instructions executable by the at least one processor whereby the radio access node is operable to receive an RA transmission from a wireless device; detect an RA preamble in the RA transmission from the wireless device; and estimate a timing parameter of the wireless device using the RA transmission from the wireless device separately from detecting the RA preamble.

In some embodiments, a radio access node includes one or more modules operative to receive an RA transmission from a wireless device, detect an RA preamble in the RA transmission from the wireless device, and estimate a timing parameter of the wireless device using the RA transmission from the wireless device separately from detecting the RA preamble.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Certain embodiments are presented in recognition of shortcomings of alternative approaches, such as the following.

The described embodiments may be implemented in any appropriate type of communication system supporting any suitable communication standards and using any suitable components. As one example, certain embodiments may be implemented in a Long Term Evolution (LTE) communications network, such as that illustrated in FIG. 1. LTE terminology is used herein to aid in understanding. However, the present disclosure is not limited thereto. For instance, the cellular communications network could be a Long Term Evolution in Unlicensed Spectrum (LTE-U) cellular communications network or a New Radio (NR) cellular communications network.

Figure 1:
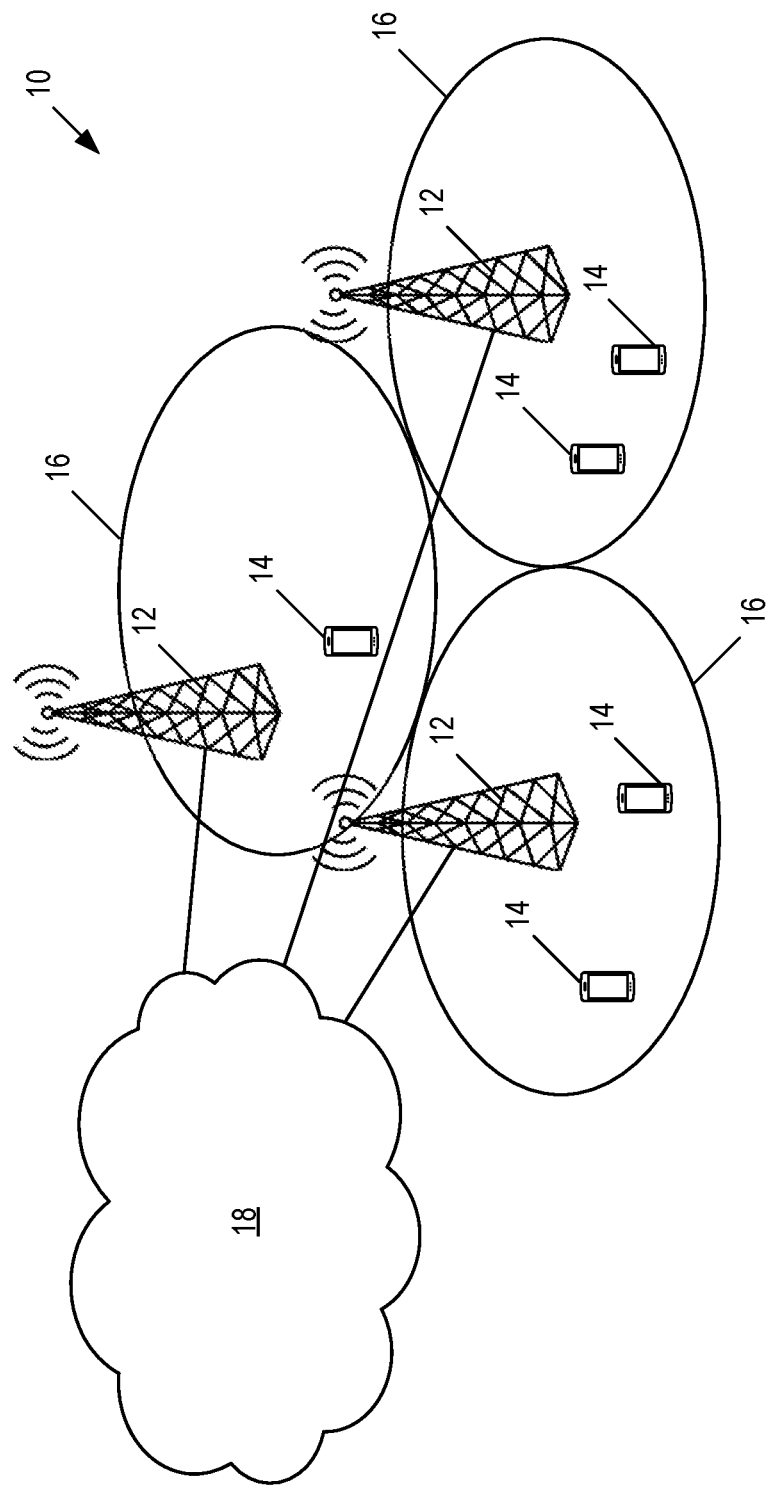
FIG. 1 is a diagram depicting an exemplary cellular communications network for communications between cells and wireless devices according to some embodiments of the present disclosure.

Referring to FIG. 1, a cellular communication network 10 comprises a plurality of radio access nodes 12 (e.g., eNodeBs or other base stations) and a plurality of wireless devices 14 (e.g., conventional User Equipments (UEs), Machine Type Communication (MTC)/Machine-to-Machine (M2M) UEs, etc.). Communication network 10 is organized into cells 16, which are connected to a core network 18 via corresponding radio access nodes 12. Radio access nodes 12 are capable of communicating with wireless communication devices 14 along with any additional elements suitable to support communication between wireless communication devices or between a wireless communication device and another communication device (such as a landline telephone).

Today, the unlicensed 5 gigahertz (GHz) spectrum is mainly used by equipment implementing the IEEE 802.11 Wireless Local Area Network (WLAN) standard, also known under its marketing brand as "Wi-Fi."

Figure 2:
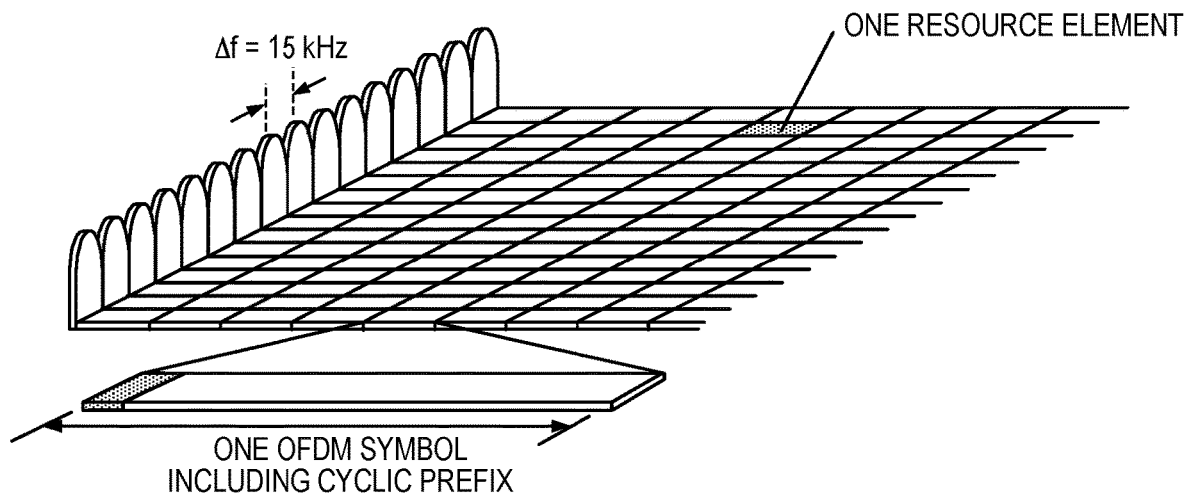
FIG. 2 is a diagram depicting a downlink physical resource according to some embodiments of the present disclosure.

LTE uses Orthogonal Frequency Division Multiplexing (OFDM) in the downlink and Discrete Fourier Transform (DFT)-spread OFDM (also referred to as Single-Carrier Frequency Division Multiple Access (SC-FDMA)) in the uplink. The basic LTE downlink physical resource can thus be seen as a time-frequency grid as illustrated in FIG. 2, where each Resource Element (RE) corresponds to one OFDM subcarrier during one OFDM symbol interval. The uplink subframe has the same subcarrier spacing as the downlink and the same number of SC-FDMA symbols in the time domain as OFDM symbols in the downlink.

Figure 3:
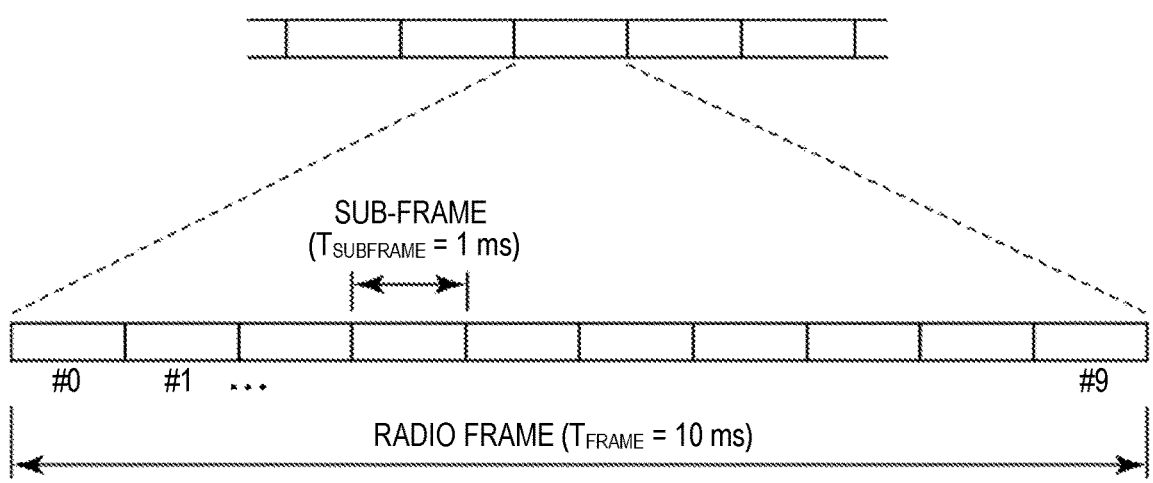
FIG. 3 is a diagram depicting a time domain structure according to some embodiments of the present disclosure.

In the time domain, LTE downlink transmissions are organized into radio frames of 10 ms, each radio frame comprising ten equally-sized subframes of length $T_{subframe}=1$ ms as shown in FIG. 3. Each subframe comprises two slots of duration 0.5 ms each, and the slot numbering within a frame ranges from 0 to 19. For normal cyclic prefix, one subframe comprises 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Figure 4:
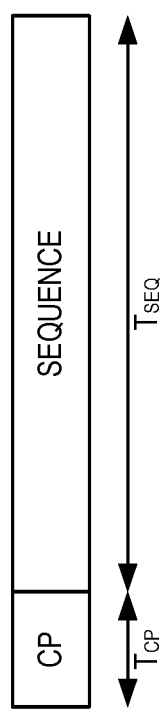
FIG. 4 a diagram depicting a Random Access (RA) preamble format according to some embodiments of the present disclosure.

In LTE, the Physical RA Channel (PRACH) is used for initial network access, but the PRACH does not carry any user data, which is exclusively sent on the Physical Uplink Shared Channel (PUSCH). Instead, the LTE PRACH is used to achieve uplink time synchronization for a UE which either has not yet acquired, or has lost, its uplink synchronization. The RA preamble sent on the PRACH has the structure shown in FIG. 4, where it is seen to comprise a cyclic prefix followed by a preamble sequence derived from a Zadoff-Chu root sequence. In the time domain, the PRACH may span between one to three subframes for FDD LTE. Any unused portion of the last PRACH subframe is utilized as a guard period. In the frequency domain, the PRACH spans six resource blocks (1.08 MHz).

Several methods have been proposed for how to detect the PRACH preambles, see e.g., [S. Sesia. I. Toufik. M Baker "LTE, The UMTS Long Term Evolution, From Theory to Practice", Second Edition, John Wiley & Sons Ltd., 2011]. Here both a full frequency domain and a hybrid time-frequency approach are presented. In a full frequency approach, the received signal is processed with a Fast Fourier Transform (FFT) corresponding to the length of the preamble. Hence, an FFT of length 24,576 is thus required for each antenna. Dedicated hardware is commonly used for this PRACH FFT. After this large FFT, the PRACH bandwidth is extracted, which is a subset of the output from this large FFT. A power delay profile is calculated by a frequency matched filter followed by an Inverse Discrete Fourier Transform (IDFT) and absolute square.

In the hybrid time-frequency approach, a low-pass filter is first used in the time domain in order to extract the PRACH bandwidth. This lowpass filter is followed by an FFT of a size much smaller than 24,576. One such low-pass filter has to be applied to each antenna signal.

Figure 5:
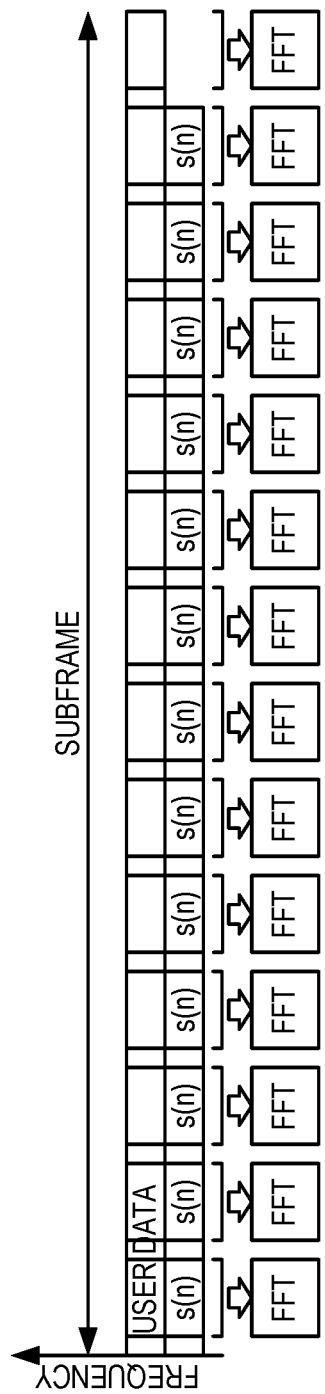
FIG. 5 illustrates a preamble format with preamble constructed by several symbols each with a cyclic prefix, according to some embodiments of the present disclosure.
Figure 6:
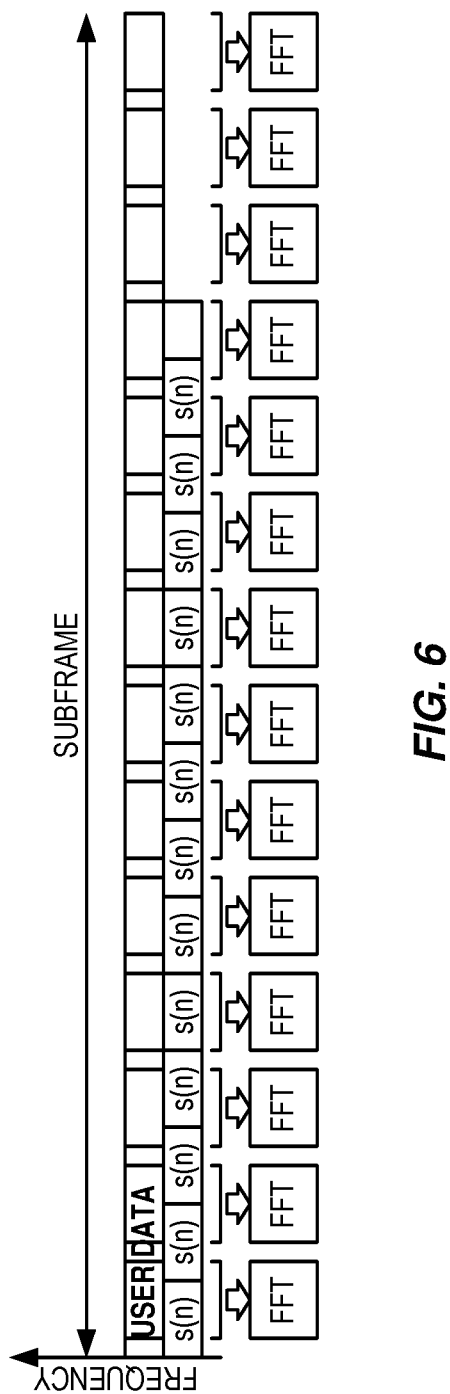
FIG. 6 illustrates a preamble format with preamble constructed by repeating symbols, according to some embodiments of the present disclosure.

Two PRACH preamble formats are described in [R1-163146, PRACH design for Enhanced LAA, Ericsson], which are also illustrated in FIG. 5 and FIG. 6 below.

The PRACH preamble in FIG. 5 has one cyclic prefix for each Discrete Fourier Transform Spread (DFTS)-OFDM symbol of length 160 samples for the first DFTS-OFDM symbol of each slot, and 144 samples for the remaining DFTS-OFDM symbols.

Another possible design of PRACH preambles is illustrated in FIG. 6, where one DFTS-OFDM symbol is repeated several times such that each DFTS-OFDM symbol acts as a cyclic prefix for the next DFTS-OFDM symbol. Delay of up to one DFTS-OFDM symbol is supported with the approach of generating PRACH preambles as in FIG. 6. This maximum delay of 2048 samples corresponds to 66.7 microseconds or a cell radius of 10 km, which is sufficient for Enhanced License Assisted Access (eLAA) deployments.

Figure 7:
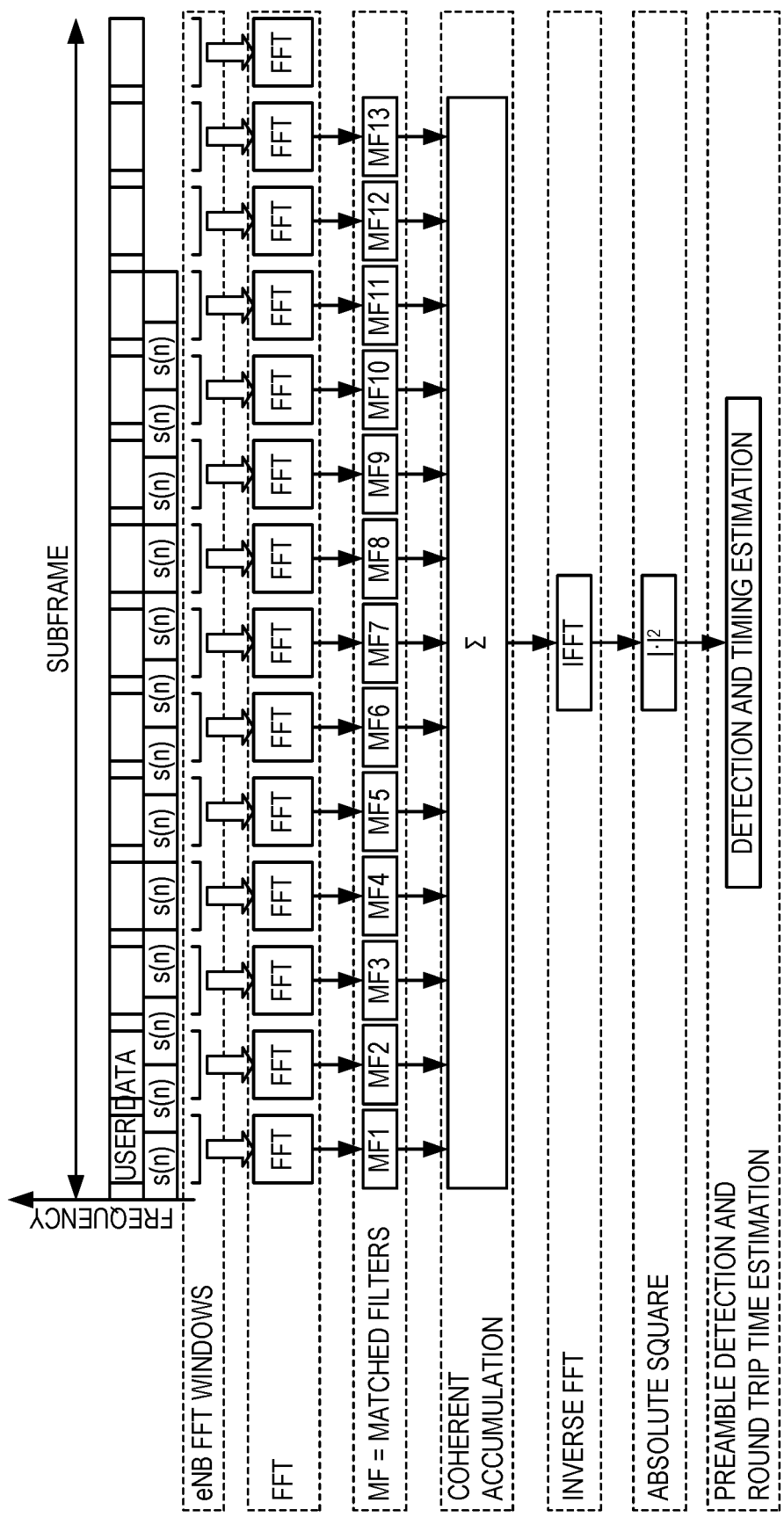
FIG. 7 illustrates an RA preamble receiver structure according to some embodiments of the present disclosure.

An illustration of a simple receiver structure for PRACH preambles is given in FIG. 7. Here, an FFT is calculated for each DFTS-OFDM symbol forming frequency domain signals, which are used in both the PUSCH receiver and the PRACH preamble detector. After extracting the sub-carriers corresponding to the interlace on which each PRACH preamble is mapped, each frequency domain signal is multiplied by a matched filter. The outputs from the matched filters are coherently added, transformed to time domain by an IFFT, and a Power Delay Profile (PDP) is calculated as the absolute square of each time domain value. Detection of a PRACH preamble is done by comparing the values of the PDP with a threshold.

A receiver structure for the PRACH preamble format with a Cyclic Prefix (CP) for each DFTS-OFDM symbol is almost identical to the one illustrated in FIG. 7. The only difference is that the matched filters MF1 to MF13 are identical filters for the preamble format in FIG. 5, while the matched filters for the PRACH preamble format in FIG. 6 will have matched filters adjusted to a cyclic shifted version of the repeated DFTS-OFDM symbol.

3GPP has discussed interlacing transmissions as a mechanism to give License Assisted Access (LAA) uplink (UL) signals with small bandwidth higher transmission powers when needed (and, to a lesser extent, to satisfy the transmission bandwidth requirement). The interlacing transmissions can be done on a Physical Resource Block (PRB) basis. Interlacing on a sub-carrier basis is not a good choice since these transmissions would suffer from Inter Carrier Interference (ICI) in scenarios with large frequency offsets or with a delay spread larger than the cyclic prefix.

Figure 8:
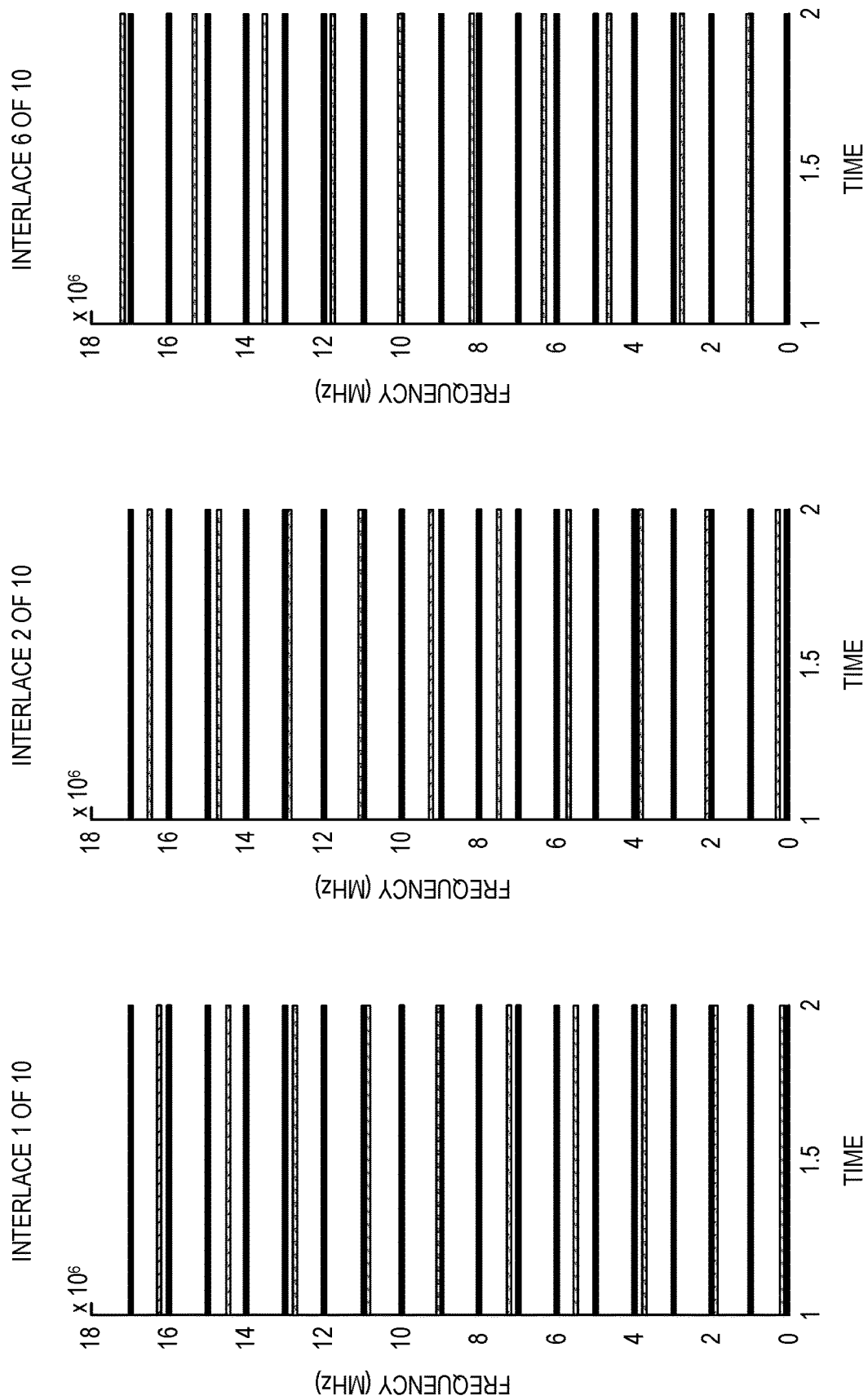
FIG. 8 illustrates different interlacing allocations in a design using ten interlaces according to some embodiments of the present disclosure.

An example of an interlace design using ten interlaces, with a system bandwidth of 20 MHz (100 Resource Blocks), along with three example allocations is shown in FIG. 8. The solid lines represent example boundaries of the Power Spectral Density (PSD) requirement measurement intervals (1 MHz resolution bandwidth). The hashed stripes represent the allocated Resource Blocks (RBs) for the particular interlace. Hence the boundaries shown in FIG. 8 only represent one particular position of the measurement window. The figure to the left shows the allocation of interlace one out of ten, the middle figure shows the allocation of interlace two out of ten and the right figure shows the allocation of interlace six out of ten.

Figure 9:
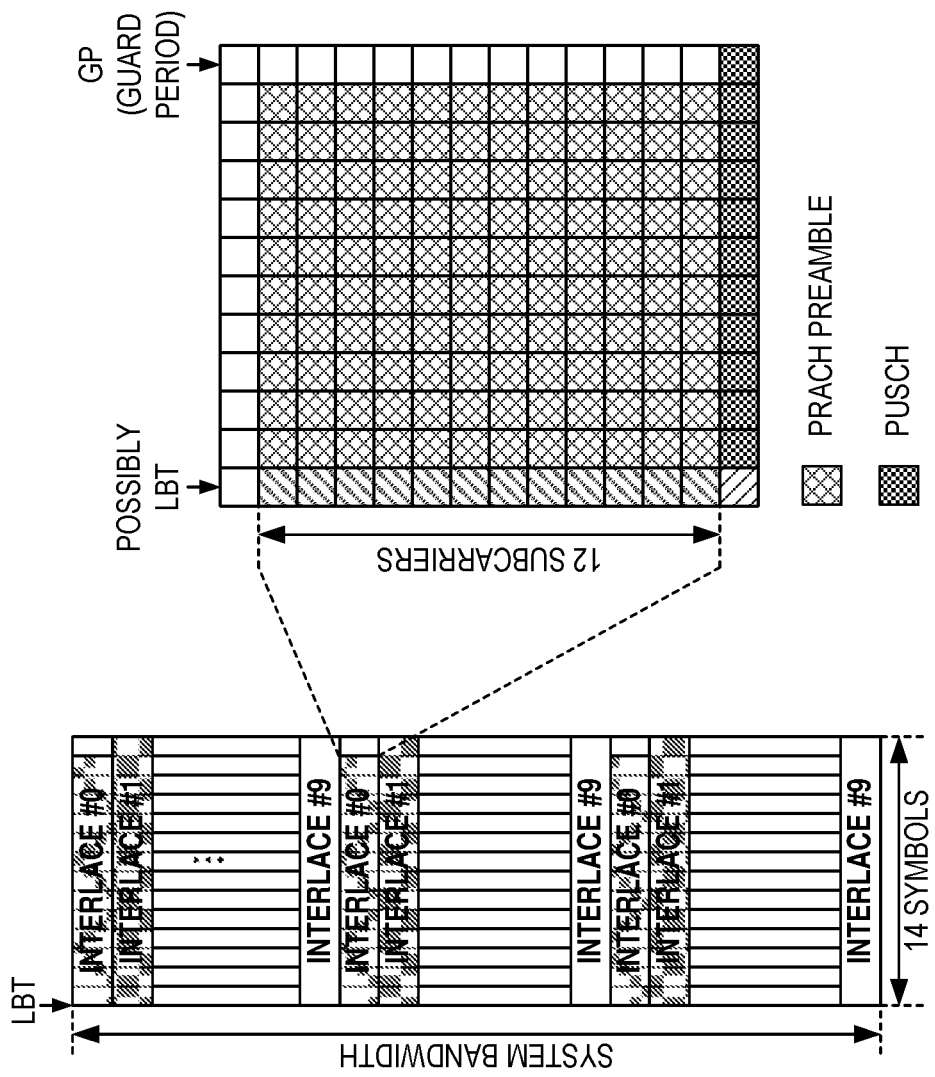
FIG. 9 illustrates a specific interlacing allocation according to some embodiments of the present disclosure.

FIG. 9 illustrates a specific interlacing allocation according to some embodiments of the present disclosure. This is an interlacing allocation for PRACH preambles for eLAA, again with ten interlaces.

Certain types of detector and timing estimators may use the same receiver for both detection and timing estimation. Here, the performance of preamble detection and timing estimations leads to conflicting processing requirements. Furthermore, this common PRACH detector and timing estimator requires quite high computational complexity.

As discussed above, the initial RA procedure for stand-alone LTE-U should involve as few transmissions as possible and also have low latency, such that the number of Listen Before Talk (LBT) operations can be minimized and the RA procedure can then be completed as quickly as possible. There is a need for an improved RA procedure to address these issues.

Systems and methods for processing an RA transmission are disclosed. In some embodiments, a method of operating a radio access node 12 in a cellular communications network 10 includes receiving an RA transmission from a wireless device 14. The method also includes detecting an RA preamble in the RA transmission from the wireless device 14 and estimating a timing parameter of the wireless device 14 using the RA transmission from the wireless device 14 separately from detecting the RA preamble. By estimating the timing parameter separately from detecting the RA preamble, increased detection of the RA preamble is possible while also increasing the precision of the timing parameter estimate. In some embodiments, this separation also enables a complexity reduction of the receiver if a low complexity detector is used first and then the high complexity timing estimator is only used when an RA preamble is detected.

Figure 10:
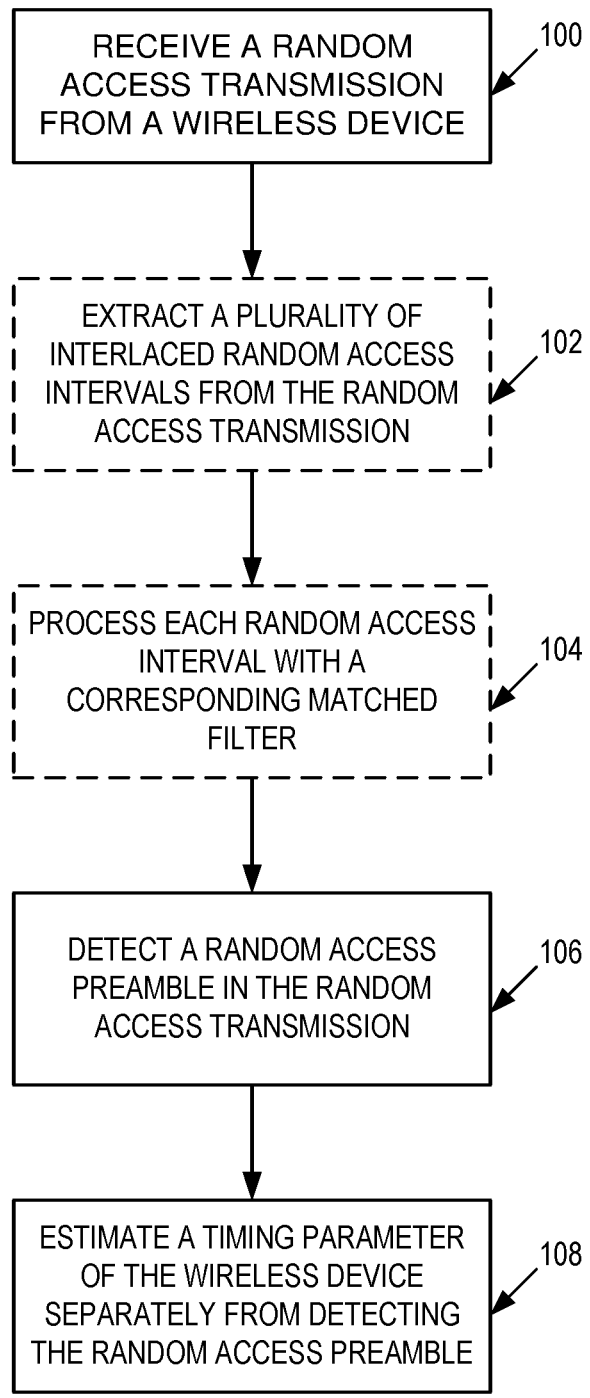
FIG. 10 illustrates a method of processing an RA transmission from a wireless device according to some embodiments of the present disclosure.

FIG. 10 illustrates a method of processing an RA transmission from a wireless device 14 according to some embodiments of the present disclosure. First, the radio access node 12 receives an RA transmission from a wireless device 14 (step 100). Optionally, if interleaving is being used as discussed above, the radio access node 12 extracts multiple interlaced RA intervals from the RA transmission (step 102). Each of the RA intervals is optionally processed with a corresponding matched filter (step 104). As discussed above in relation to FIGS. 5 and 6, the matched filters may vary depending on the structure of the RA preamble. In some embodiments, each RA interval includes a cyclic prefix and each of the corresponding matched filters is the same. In some other embodiments, each RA interval does not include a cyclic prefix and at least one of the corresponding matched filters is different.

FIG. 10 also shows that the radio access node 12 detects an RA preamble in the RA transmission (step 106). As discussed in more detail below, this may include using a narrowband Inverse Fast Fourier Transform (IFFT) of the RA transmission from the wireless device 14. In some embodiments, this includes using an oversampled IFFT such as zero padding of the signal to be processed by the IFFT.

Then, the radio access node 12 estimates a timing parameter of the wireless device 14 separately from detecting the RA preamble (step 108). In some embodiments, this timing parameter is only estimated in response to detecting the RA preamble in the RA transmission from the wireless device 14. By estimating the timing parameter separately from detecting the RA preamble, increased detection of the RA preamble is possible while also increasing the precision of the timing parameter estimate. In some embodiments, this separation also enables a complexity reduction of the receiver if a low complexity detector is used first, and then the high complexity timing estimator is only used when an RA preamble is detected. In some embodiments, estimating the timing parameter of the wireless device 14 using the RA transmission from the wireless device 14 includes estimating the timing parameter using a wideband IFFT of the RA transmission from the wireless device 14. In some embodiments, calculating an IFFT of the RA transmission from the wireless device 14 where values that do not contain the RA preamble are zeroes such that the wideband IFFT spans a whole system bandwidth.

In certain embodiments, a PRACH receiver structure uses separate processing methods for preamble detection and timing estimation. For instance, a set of oversampled and narrowband IFFTs may be used for preamble detection, and a wide IFFT may be used for timing estimation.

Certain potential benefits of described embodiments may include the following. The performance of the "PRACH preamble detection" can be improved if the processing is done over small frequency intervals which are non-coherently added, while the "PRACH timing estimation performance" is improved by processing over wider frequency intervals. Furthermore, computational complexity in the PRACH receiver can be reduced if a low computational complexity detector is used first and then only process with a high computational complexity timing estimator when a PRACH preamble is detected.

Figure 11:
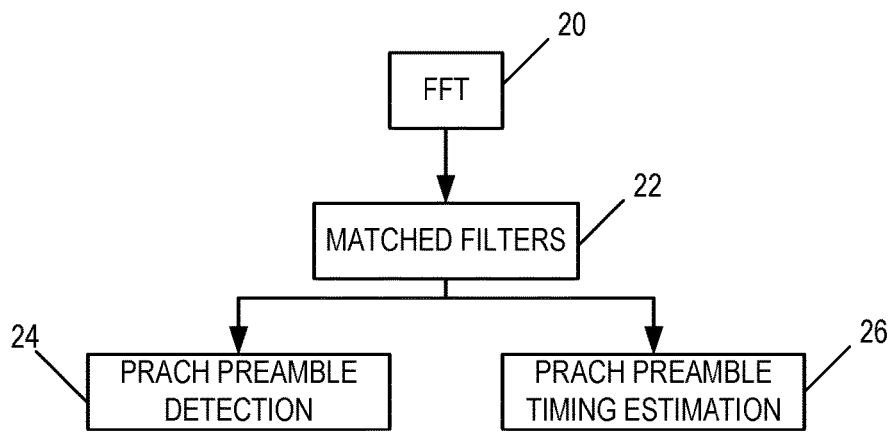
FIG. 11 illustrates separate processing blocks for preamble detection and timing estimation according to some embodiments of the present disclosure.
Figure 12:
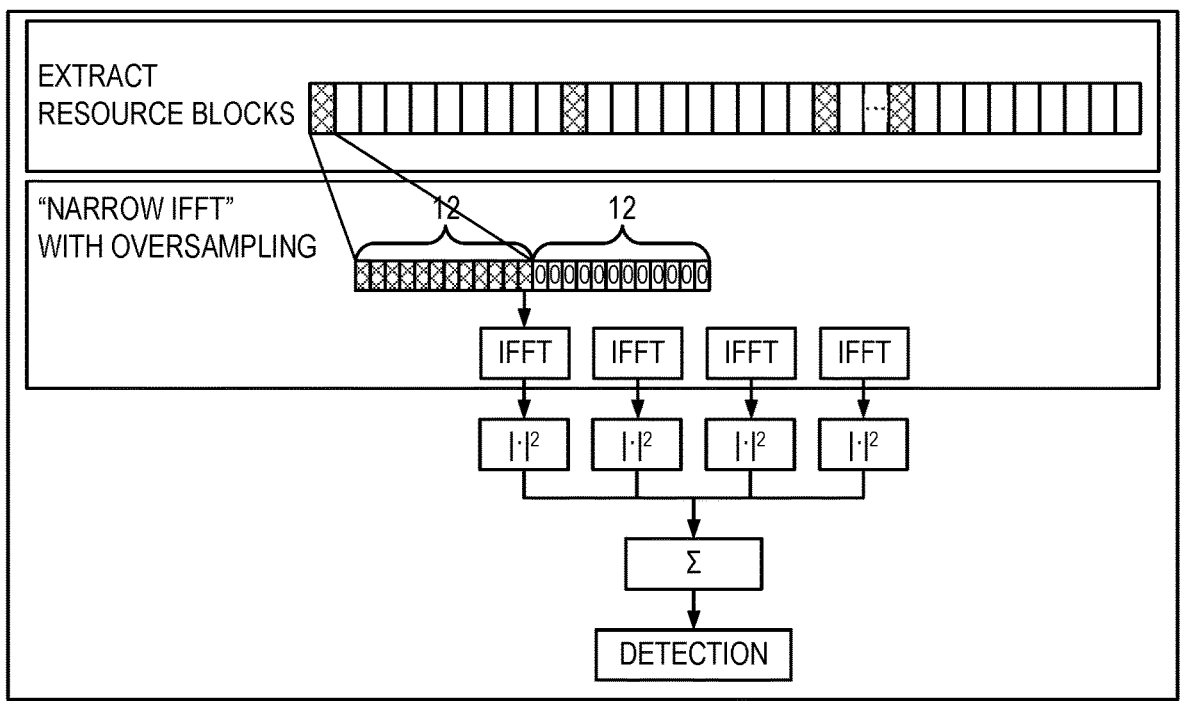
FIG. 12 illustrates preamble detection of interlaced intervals of sub-carriers and with oversampling according to some embodiments of the present disclosure.
Figure 18:
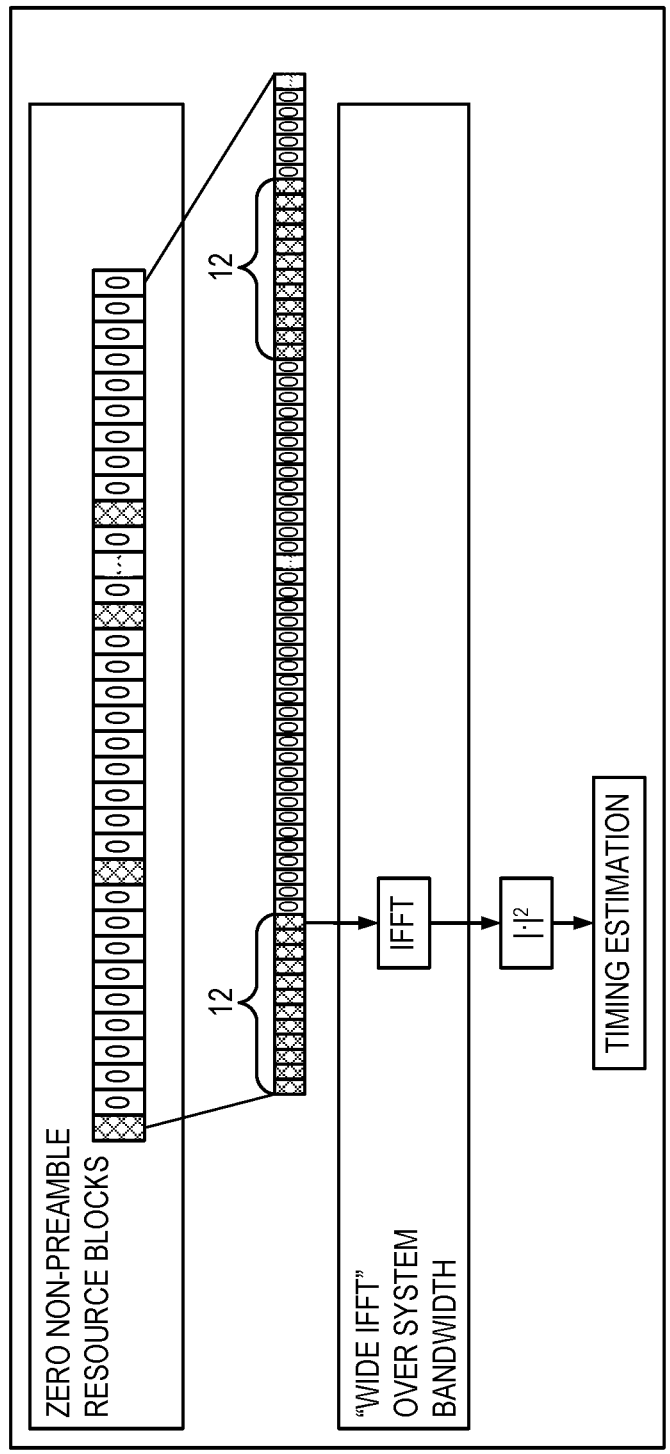
FIG. 18 illustrates timing estimation with zero inserting according to some embodiments of the present disclosure.

FIG. 11 shows a receiver structure with separate processing of PRACH preamble detection and PRACH timing estimation. Here, a common FFT 20 is calculated of received samples, and a frequency domain matched filter 22 is applied. Then, PRACH preamble detection 24 and PRACH timing estimation 26 can be separated as needed. A more detailed illustration of a PRACH preamble detector is shown in FIG. 12, and PRACH preamble timing estimation is illustrated in FIG. 18.

In a PRACH preamble detector, the preamble should be detected with high reliability but without false detections when there is no preamble transmitted. In FIG. 12, resource blocks related to sub-carriers used for the PRACH preamble are extracted. Here, the sub-carriers used for PRACH are interlaced such that several intervals, e.g., each of one resource block of 12 resource elements are used for the PRACH preambles, which are separated by resource elements used for transmissions of other signals from other UEs 14. Each of these intervals of extracted sub-carriers is processed with a separate IFFT. However, the same approach of separate IFFTs of several intervals can also be used without interlacing.

Within this IFFT, an oversampling can be done by zero padding before IFFT. The impact of this interpolation is illustrated by comparing FIG. 13 without oversampling and FIG. 14 with oversampling. In these illustrations, the PDP is illustrated which is the absolute square of output from the IFFT.

Figure 13:
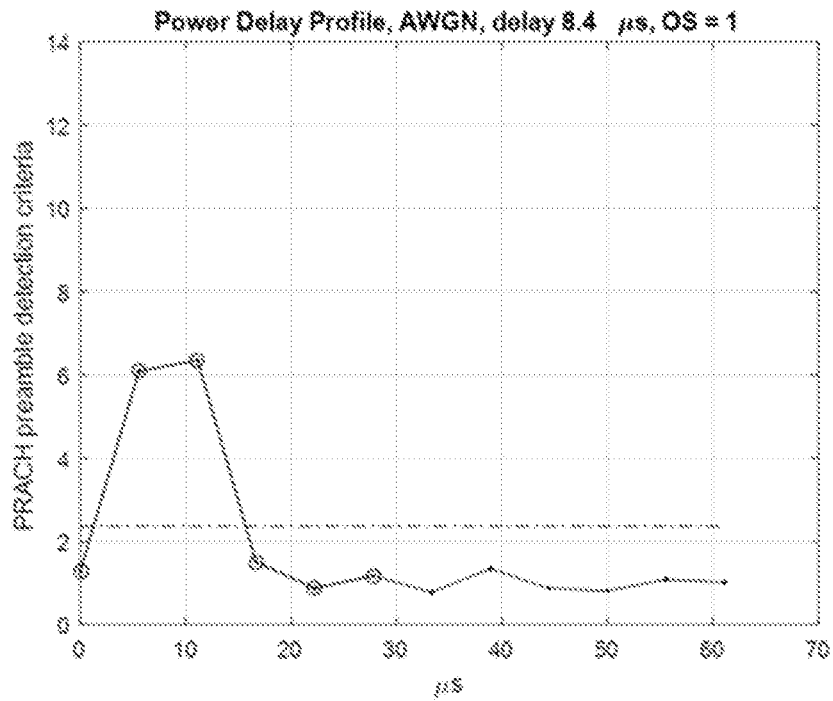
FIGS. 13 and 14 illustrate power delay profiles without and with oversampling according to some embodiments of the present disclosure.
Figure 14:
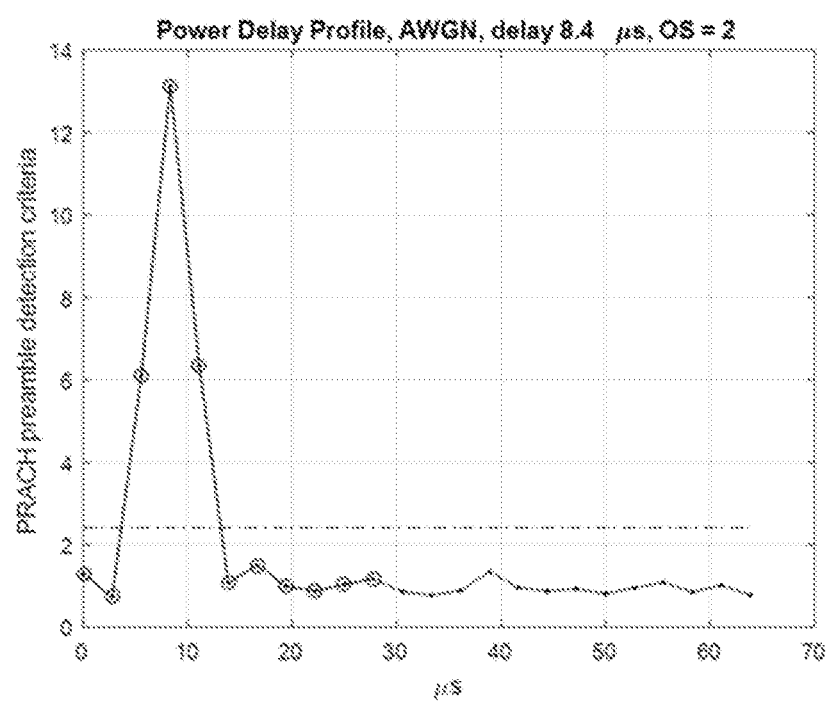
Figure 15:
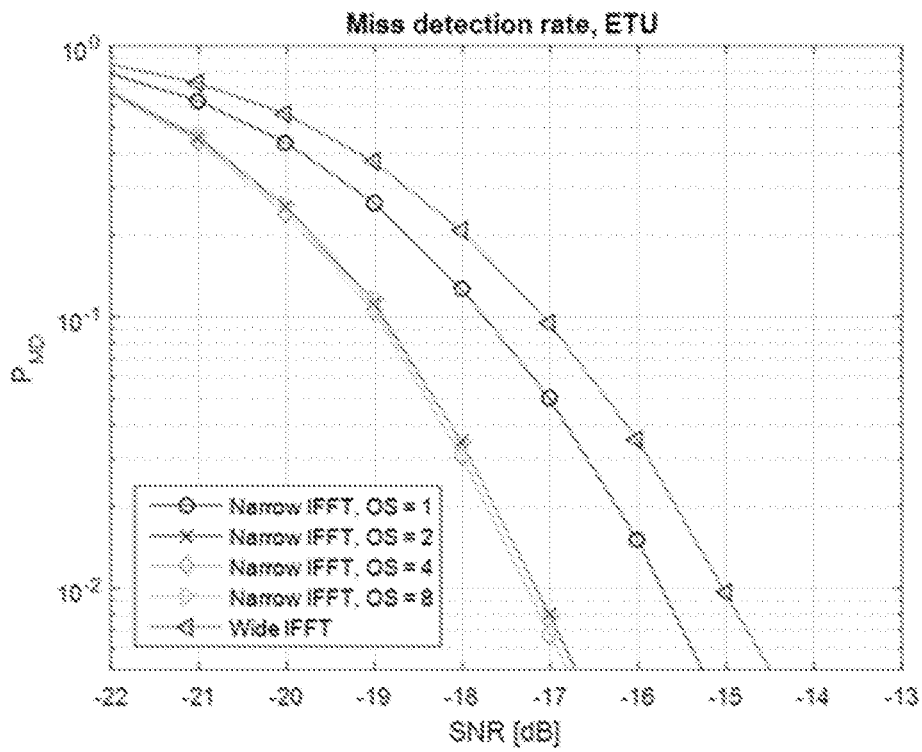
FIG. 15 illustrates a miss detection rate versus a Signal to Noise Ratio (SNR) according to some embodiments of the present disclosure.

Without oversampling, the peak of the delay might appear between the samples in the PDP, as can be seen in FIG. 13. This has a negative impact on the detection performance as illustrated in FIG. 15, where the miss detection rate is simulated versus Signal to Noise Ratio (SNR). The best performance is achieved with an oversampling of four or eight, but an oversampling of two gives a performance very close to a larger oversampling while requiring less computation. Performance of a "wide IFFT" is also included which is a method described in further detail below.

The time resolution of the IFFT is equal to the length of the OFDM symbol divided by the IFFT size:

$$\Delta_T = \frac{\text{length of symbol}}{\text{FFT size}} = \frac{66.6 \ \mu s}{N_{FFT}}$$

Figure 16:
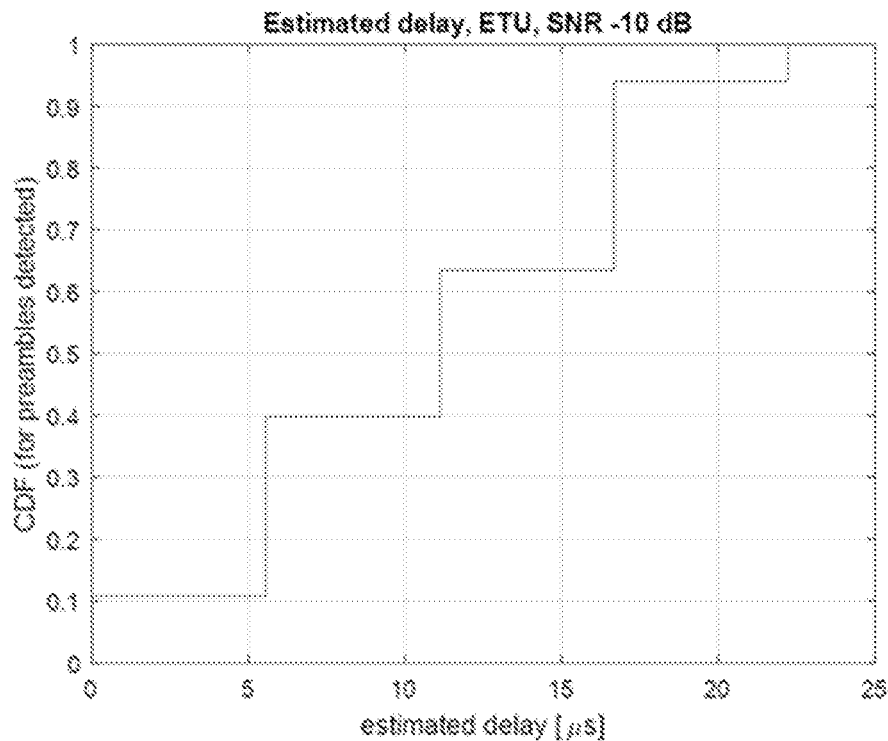
FIGS. 16 and 17 illustrate a resolution of timing estimate without and with oversampling according to some embodiments of the present disclosure.
Figure 17:
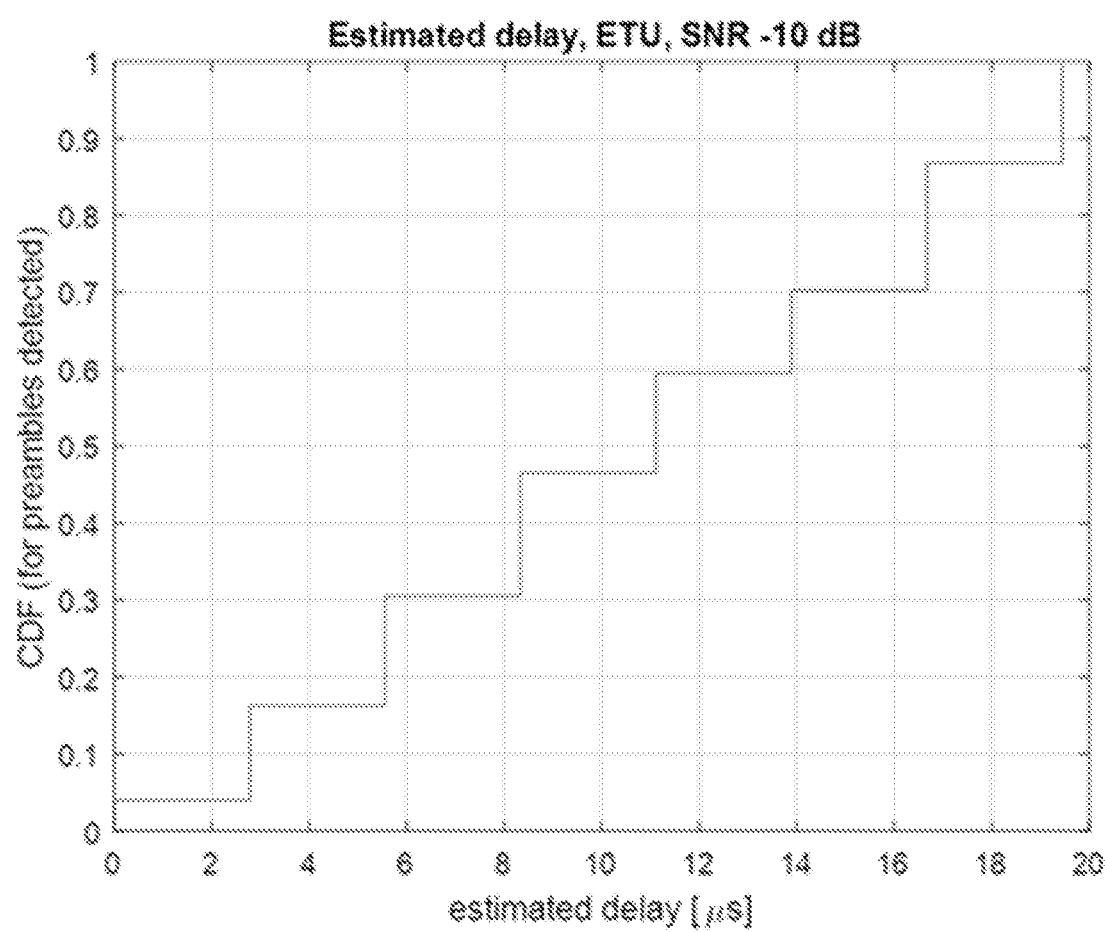

A zero padding of frequency signal corresponds to an increased resolution in time domain. With an IFFT over 12 resource elements and without oversampling in IFFT, i.e., $N_{FFT}=12$, the resolution equals $\Delta_T=5.6$ μs, as is shown in FIG. 16. However, with oversampling in IFFT with e.g., a factor two, then the IFFT has size: $N_{FFT}=24$, and the resolution equals $\Delta_T=2.8$ μs, as is shown in FIG. 17. By further increasing the oversampling, the resolution is increase such that $N_{FFT}=48$ leads to a resolution of $\Delta_T=1.4$ μs, and $N_{FFT}=96$ results in a resolution of $\Delta_T=0.7$ μs.

An illustration is given in FIG. 18 of a PRACH preamble timing estimation with an interlaced frequency domain mapping. Here, the sub-carriers which are not used by the PRACH preamble are zero when inserted into the IFFT. This leads to a very wide IFFT spanning up to the whole system bandwidth.

Figure 19:
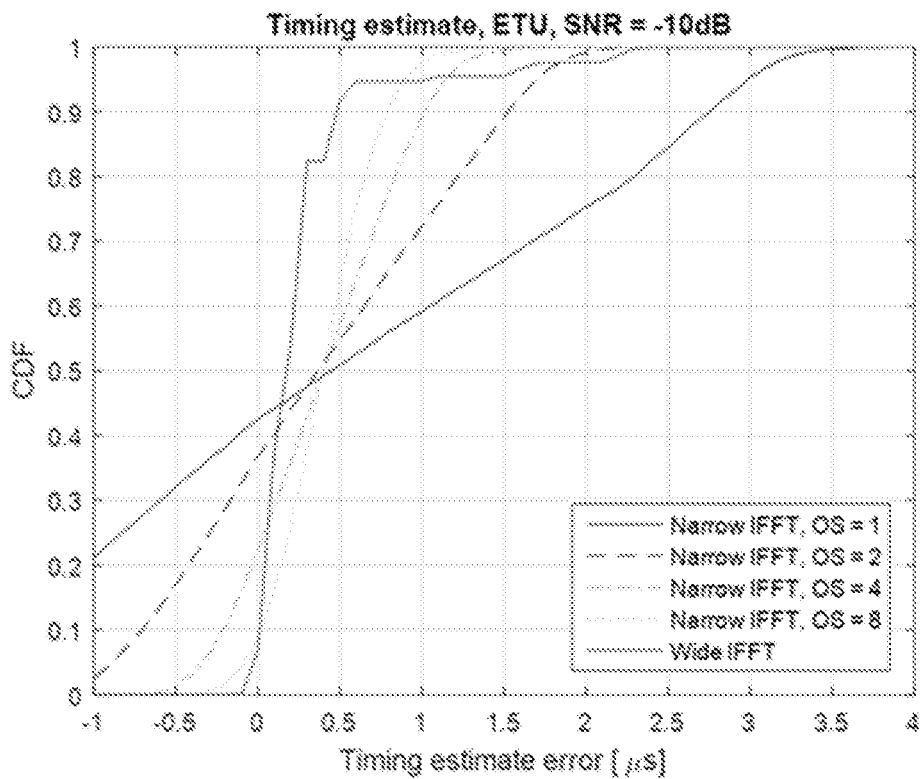
FIG. 19 illustrates timing estimate errors for various levels of oversampling according to some embodiments of the present disclosure.

Timing estimate errors are illustrated in FIG. 19, both with narrow IFFTs, as described in FIG. 12, and with a wide IFFT, as described in FIG. 18. Here, the accuracy of the timing estimation is increasing with increased oversampling. However, a wide IFFT results in the most accurate timing estimations.

Computational complexity analysis is used as a decision basis for receiver algorithms together with performance evaluations. A coarse evaluation of computational complexity is done below in which computational complexity of FFTs are approximated by a radix-2 FFT. The number of real valued multiplications by IFFT and absolute square equals:

$$2N_{FFT}\log_2(N_{FFT})+2N_{FFT}$$

where $N_{FFT}$ is the size of the IFFT. The number of real valued multiplications can be measured in terms of Multiplications and Accumulations (MACs).

A receiver with narrow IFFT and oversampling has the following number of MACs:

$$N_{RB}(2N_{IFFT}\log_2(N_{IFFT})+2N_{IFFT})$$

where $N_{IFFT}=12 \cdot D_{OS}$ is the size of the IFFT, the oversampling is parameterized with $D_{OS}=1, 2, 4, 8$ or 16, and $N_{RB}=10$ for one interlace A receiver with a wide IFFT has the following MACs:

$$2N_{RE}\log_2(N_{RE})+2N_{RE}$$

where the number of resource elements equals $N_{RE}=1200$. Here the computational complexity is independent of the number of interlaces used.

Figure 20:
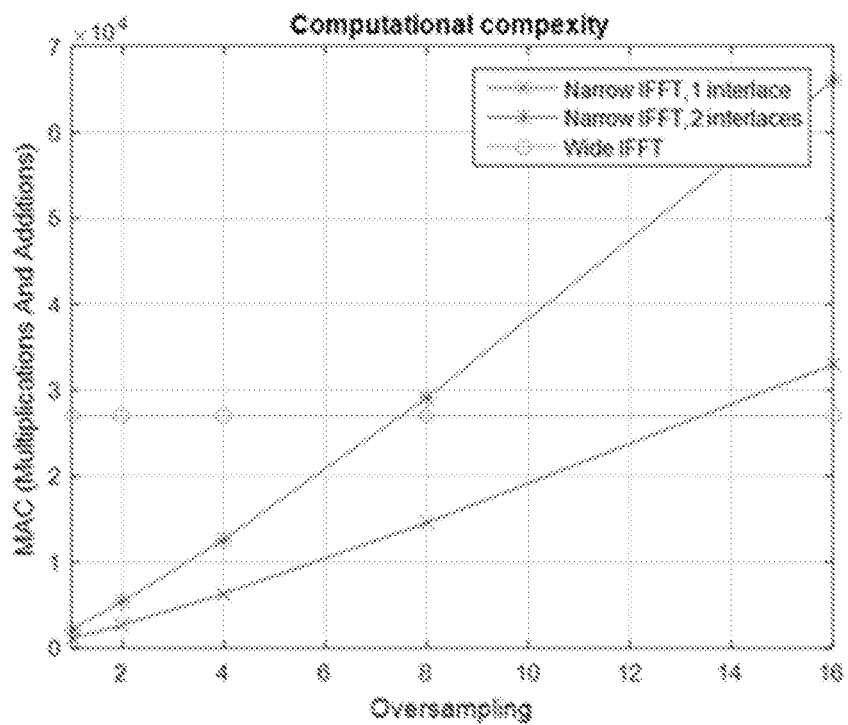
FIG. 20 illustrates the computational complexity for timing estimation for various levels of oversampling according to some embodiments of the present disclosure.

FIG. 20 illustrates the computational complexity of various IFFT implementations. Here the narrow IFFT, with oversampling less than eight, has much lower computational complexity than the wide IFFT. As indicated in FIG. 15, the PRACH preamble detection with oversampling equal to two gives good false detection performance. Thus, having a narrow IFFT with oversampling of two gives both good detection performance and low computational complexity, while a timing estimator should be based on a wide IFFT or narrow IFFT with higher oversampling for accurate timing estimation.

Figure 21:
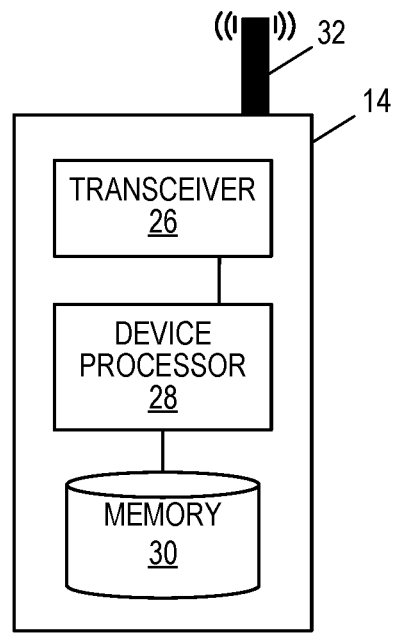
FIG. 21 is a block diagram of a wireless device according to some embodiments of the present disclosure.

Although wireless communication devices 14 may represent communication devices that include any suitable combination of hardware and/or software, these wireless communication devices may, in certain embodiments, represent devices such as an example wireless communication device illustrated in greater detail by FIG. 21. Similarly, although the illustrated radio access node 12 may represent network nodes that include any suitable combination of hardware and/or software, these nodes may, in particular embodiments, represent devices such as the example radio access node illustrated in greater detail by FIG. 22.

Referring to FIG. 21, a wireless device 14 comprises a transceiver 27, a processor 28, a memory 30, and an antenna 32. In certain embodiments, some or all of the functionality described as being provided by UEs, MTC or M2M devices, and/or any other types of wireless communication devices 14 may be provided by the device processor 28 executing instructions stored on a computer-readable medium, such as the memory 30 shown in FIG. 21. Alternative embodiments may include additional components beyond those shown in FIG. 21 that may be responsible for providing certain aspects of the device's functionality, including any of the functionality described herein.

Figure 22:
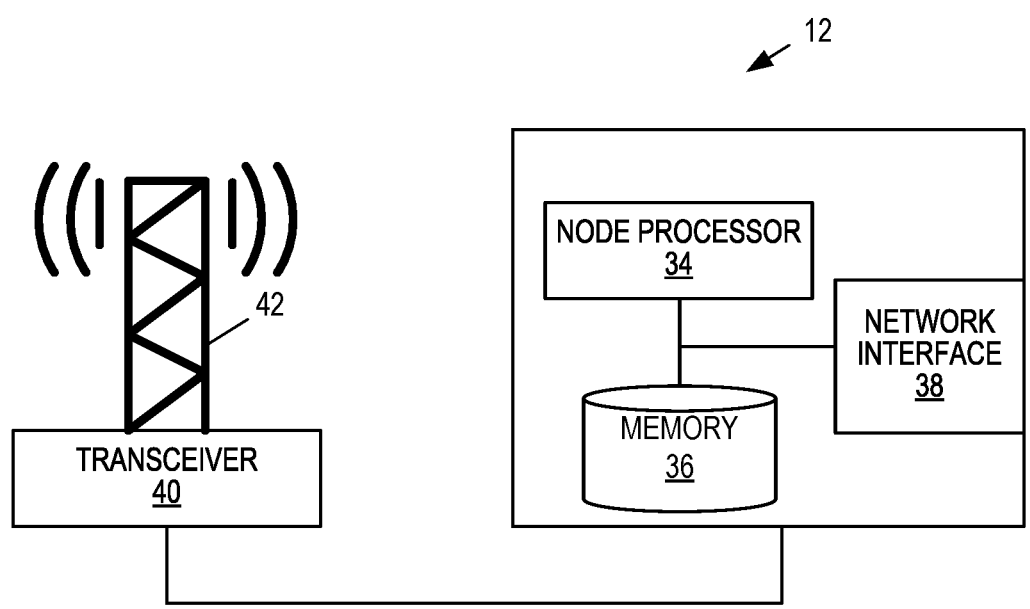
FIG. 22 is a block diagram of a radio access node according to some embodiments of the present disclosure.

Referring to FIG. 22, a radio access node 12 comprises a node processor 34, a memory 36, a network interface 38, a transceiver 40, and an antenna 42. In certain embodiments, some or all of the functionality described as being provided by a base station, a node B, an eNodeB, and/or any other type of network node may be provided by node processor 34 executing instructions stored on a computer-readable medium, such as memory 36 shown in FIG. 22. Alternative embodiments of radio access node 12 may comprise additional components to provide additional functionality, such as the functionality described herein and/or related supporting functionality.

As indicated by the foregoing, certain embodiments provide separate processing for PRACH preamble detection and PRACH timing estimation.

Figure 23:
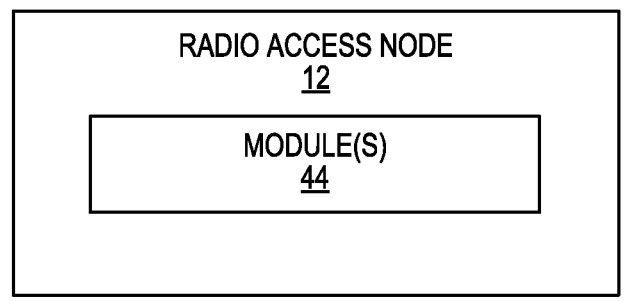
FIG. 23 is a block diagram of a radio access node including modules according to some embodiments of the present disclosure.

FIG. 23 is a block diagram of a radio access node 12 including modules 44 according to some embodiments of the present disclosure. Modules 44 are operative to receive an RA transmission from a wireless device 14, detect an RA preamble in the RA transmission from the wireless device 14, and estimate a timing parameter of the wireless device 14 using the RA transmission from the wireless device 14 separately from detecting the RA preamble.

Figure 24:
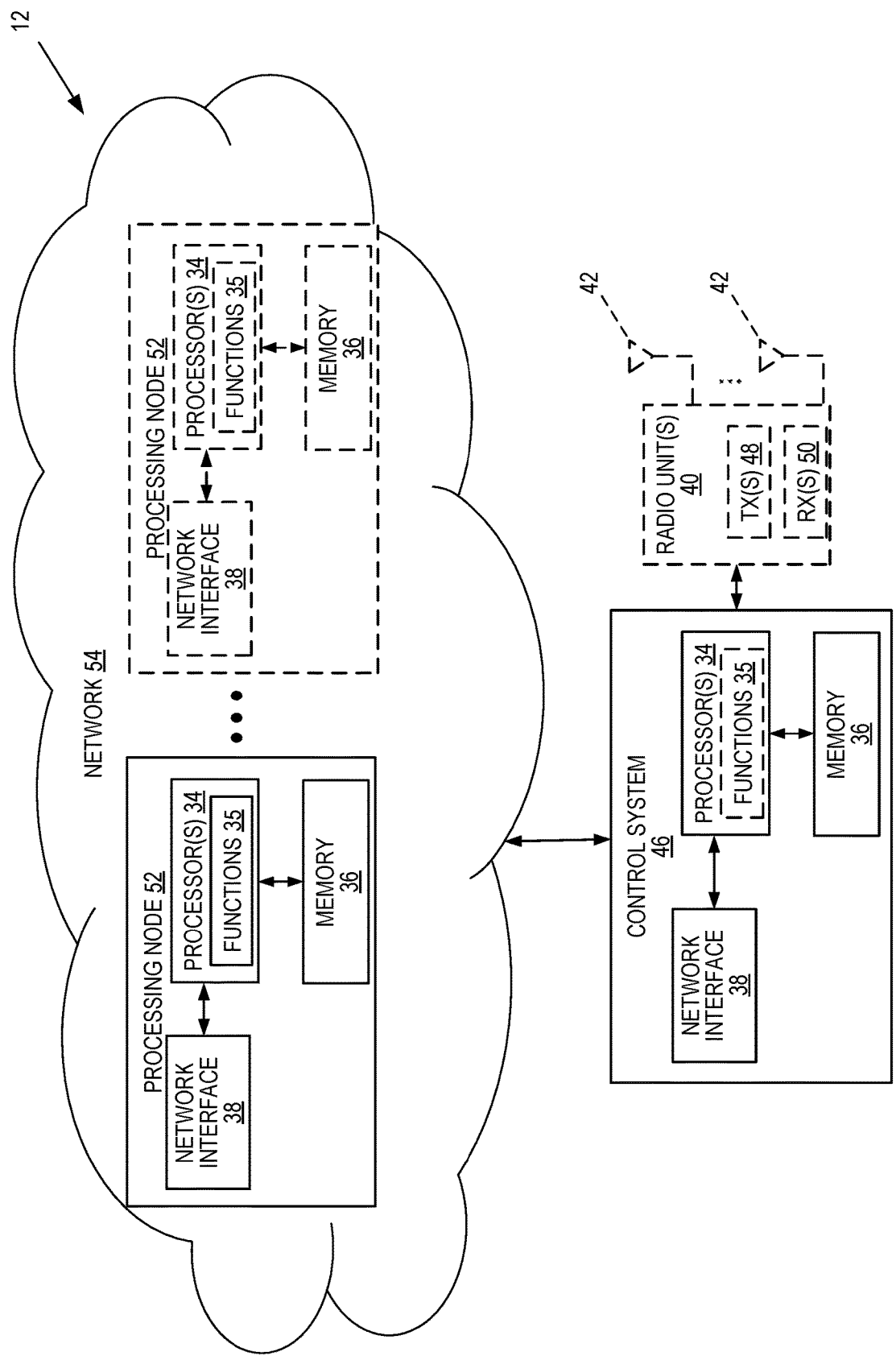
FIG. 24 is a block diagram of a virtualized radio access node according to some embodiments of the present disclosure.

FIG. 24 is a schematic block diagram that illustrates a virtualized embodiment of the radio access node 12 according to some embodiments of the present disclosure. This discussion is equally applicable to other types of radio access nodes. Further, other types of network nodes may have similar architectures (particularly with respect to including processor(s), memory, and a network interface).

As used herein, a "virtualized" radio access node 12 is a radio access node 12 in which at least a portion of the baseband functionality is implemented as a virtual component (e.g., via a virtual machine(s) executing on a physical processing node(s) in a network(s)). As illustrated, the radio access node 12 includes a control system 46 that includes one or more processors 34 (e.g., Central Processing Units (CPUs), Application Specific Integrated Circuits (ASICs), Field Programmable Gate Arrays (FPGAs), and/or the like), memory 36, and network interface 38 as well as the one or more radio units 40 each of which includes one or more transmitters 48 and one or more receivers 50 coupled to one or more antennas 42, as described above. The control system 46 is connected to radio unit(s) 40 via, for example, an optical cable or the like. The control system 46 is connected to one or more processing nodes 52 coupled to or included as part of a network(s) 54 via the network interface 38. Each processing node 52 includes one or more node processors 34 (e.g., CPUs, ASICs, FPGAs, and/or the like), memory 36, and a network interface 38.

In this example, the functions 35 of the radio access node 12 described herein are implemented at the one or more processing nodes 52 or distributed across the control system 46 and the one or more processing nodes 52 in any desired manner. In some particular embodiments, some or all of the functions 35 of the radio access node 12 described herein are implemented as virtual components executed by one or more virtual machines implemented in a virtual environment(s) hosted by the processing node(s) 52. As will be appreciated by one of ordinary skill in the art, additional signaling or communication between the processing node(s) 52 and the control system 46 is used in order to carry out at least some of the desired functions such as, for example, transmitting the grant and/or transmitting the indication of the carrier mode of at least one carrier. Notably, in some embodiments, the control system 46 may not be included, in which case the radio unit 40 communicates directly with the processing node 52 via an appropriate network interface.

In some embodiments, a computer program including instructions which, when executed by at least one processor, causes the at least one processor to carry out the functionality of a radio access node 12 (e.g., a base station 12) or a node (e.g., a processing node 52) implementing one or more of the functions 35 of the radio access node 12 in a virtual environment according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

While the disclosed subject matter has been presented above with reference to various embodiments, it will be understood that various changes in form and details may be made to the described embodiments without departing from the overall scope of the disclosed subject matter.

The following acronyms are used throughout this disclosure.

| | |
|---|---|
| 3GPP | Third Generation Partnership Project |
| ASIC | Application Specific Integrated Circuit |
| CP | Cyclic Prefix |
| CPU | Central Processing Unit |
| DFT | Discrete Fourier Transform |
| DFTS | Discrete Fourier Transform Spread |
| eLAA | Enhanced License Assisted Access |
| eNB | evolved NodeB, base station |
| FDD | Frequency Division Duplexing |
| FDMA | Frequency Division Multiple Access |
| FFT | Fast Fourier Transform |
| FPGA | Field Programmable Gate Array |
| GHz | Gigahertz |
| ICI | Inter Carrier Interference |
| IDFT | Inverse Discrete Fourier Transform |
| IEEE | Institute of Electrical and Electronics Engineers |
| IFFT | Inverse Fast Fourier Transform |
| LAA | License Assisted Access |
| eLAA | enhanced License Assisted Access |
| LBT | Listen Before Talk |
| LTE | Long Term Evolution |
| LTE-U | LTE in Unlicensed Spectrum |
| M2M | Machine-to-Machine |
| MAC | Multiplication and Accumulation |
| MTC | Machine Type Communication |
| NR | New Radio |
| OFDM | Orthogonal Frequency-Division Multiplexing |
| PDP | Power Delay Profile |
| PRACH | Physical Random Access Channel |
| PRB | Physical Resource Block |
| PSD | Power Spectral Density |
| PUSCH | Physical Uplink Shared Channel |
| RA | Random Access |
| RB | Resource Block |
| RE | Resource Element |
| SNR | Signal to Noise Ratio |
| UE | User Equipment |
| UL | Uplink |
| WLAN | Wireless Local Area Network |

Those skilled in the art will recognize improvements and modifications to the embodiments of the present disclosure. All such improvements and modifications are considered within the scope of the concepts disclosed herein and the claims that follow.

What is claimed is:

1. A method of operating a radio access node in a cellular communications network to process a random access transmission, the method comprising: receiving the random access transmission from a wireless device; detecting a random access preamble in the random access transmission from the wireless device, wherein detecting the random access preamble in the random access transmission from the wireless device comprises detecting the random access preamble using an oversampled Inverse Fast Fourier Transform (IFFT) of the random access transmission from the wireless device; and estimating a timing parameter of the wireless device using the random access transmission from the wireless device separately from detecting the random access preamble.

2. The method of claim 1 wherein estimating the timing parameter of the wireless device comprises:
estimating the timing parameter of the wireless device using the random access transmission from the wireless device in response to detecting the random access preamble in the random access transmission from the wireless device.

3. The method of claim 1 wherein using the oversampled IFFT of the random access transmission from the wireless device comprises zero padding of the signal to be processed by the IFFT.

4. The method of claim 1 wherein estimating the timing parameter of the wireless device using the random access transmission from the wireless device comprises estimating the timing parameter using a wideband IFFT of the random access transmission from the wireless device.

5. The method of claim 4 wherein using the wideband IFFT comprises calculating an IFFT of the random access transmission from the wireless device where values that do not contain the random access preamble are zeroes such that the wideband IFFT spans a whole system bandwidth.

6. The method of claim 1 wherein receiving the random access transmission from the wireless device comprises receiving a plurality of interlaced random access intervals where each interval contains the random access preamble.

7. The method of claim 6 wherein each random access interval of the plurality of interlaced random access intervals is one resource block.

8. The method of claim 6 further comprising:
extracting the plurality of interlaced random access intervals from the random access transmission from the wireless device; and
processing each random access interval of the plurality of interlaced random access intervals with a corresponding matched filter.

9. The method of claim 8 wherein each random access interval of the plurality of interlaced random access intervals includes a cyclic prefix and each of the corresponding matched filters is the same.

10. The method of claim 8 wherein each random access interval of the plurality of interlaced random access intervals does not include a cyclic prefix and at least one of the corresponding matched filters is different.

11. The method of claim 1 wherein the cellular communications network is one of:
a Long Term Evolution (LTE) cellular communications network;
a Long Term Evolution in Unlicensed Spectrum (LTE-U) cellular communications network; or
a New Radio (NR) cellular communications network.

12. The method of claim 1 wherein receiving the random access transmission from the wireless device comprises receiving the random access transmission from the wireless device on a Physical Random Access Channel (PRACH).

13. A radio access node comprising:
at least one processor; and
memory comprising instructions executable by the at least one processor whereby the radio access node is operable to:
receive a random access transmission from a wireless device;
detect a random access preamble in the random access transmission from the wireless device, wherein detecting the random access preamble in the random access transmission from the wireless device comprises being operable to detect the random access preamble using a narrowband Inverse Fast Fourier Transform (IFFT) of the random access transmission from the wireless device; and
estimate a timing parameter of the wireless device using the random access transmission from the wireless device separately from detecting the random access preamble.

14. The radio access node of claim 13 wherein estimating the timing parameter of the wireless device comprises being operable to:
estimate the timing parameter of the wireless device using the random access transmission from the wireless device in response to detecting the random access preamble in the random access transmission from the wireless device.

15. The radio access node of claim 13 wherein using the oversampled IFFT of the random access transmission from the wireless device comprises zero padding of the IFFT.

16. The radio access node of claim 13 wherein estimating the timing parameter of the wireless device using the random access transmission from the wireless device comprises being operable to estimate the timing parameter using a wideband IFFT of the random access transmission from the wireless device.

17. The radio access node of claim 16 wherein using the wideband IFFT comprises being operable to calculate an IFFT of the random access transmission from the wireless device where values that do not contain the random access preamble are zeroes such that the wideband IFFT spans a whole system bandwidth.

18. The radio access node of claim 13 wherein receiving the random access transmission from the wireless device comprises being operable to receive a plurality of interlaced random access intervals where each interval contains the random access preamble.

19. The radio access node of claim 18 wherein each random access interval of the plurality of interlaced random access intervals is one resource block.

20. The radio access node of claim 18 further operable to:
extract the plurality of interlaced random access intervals from the random access transmission from the wireless device; and
process each random access interval of the plurality of interlaced random access intervals with a corresponding matched filter.

21. The radio access node of claim 20 wherein each random access interval of the plurality of interlaced random access intervals includes a cyclic prefix and each of the corresponding matched filters is the same.

22. The radio access node of claim 20 wherein each random access interval of the plurality of interlaced random access intervals does not include a cyclic prefix and at least one of the corresponding matched filters is different.

23. A tangible, non-transitory computer-readable storage medium, having instructed stored thereon that, when executed by a processing device, cause the processing device to perform operations comprising:
receiving a random access transmission from a wireless device;
detecting a random access preamble in the random access transmission from the wireless device, wherein detecting the random access preamble in the random access transmission from the wireless device comprises being operable to detect the random access preamble using a narrowband Inverse Fast Fourier Transform (IFFT) of the random access transmission from the wireless device; and
estimating a timing parameter of the wireless device using the random access transmission from the wireless device separately from detecting the random access preamble.

* * * * *